(12) United States Patent
Kang et al.

(10) Patent No.: US 6,405,260 B2
(45) Date of Patent: *Jun. 11, 2002

(54) DATA TRANSMISSION METHOD AND APPARATUS FOR INTERFACING BETWEEN MAIN SYSTEM AND MICROCOMPUTER

(75) Inventors: Jae-Sik Kang, Suwon; Yang-Hoon Kim, Pyungtaek, both of (KR)

(73) Assignee: LG Electronics, Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/228,557

(22) Filed: Jan. 12, 1999

(30) Foreign Application Priority Data

Jan. 12, 1998 (KR) .................................. 98-536

(51) Int. Cl.[7] .............................................. G06F 13/00
(52) U.S. Cl. ..................... 709/250; 709/314; 710/52; 710/60
(58) Field of Search ................... 709/250, 314; 710/29, 52, 53, 57, 60, 65

(56) References Cited

U.S. PATENT DOCUMENTS

| | | | | | |
|---|---|---|---|---|---|
| 3,979,732 A | * | 9/1976 | Hepworth et al. | ........... | 710/108 |
| 4,485,470 A | * | 11/1984 | Reali | ........... | 370/537 |
| 4,860,283 A | * | 8/1989 | Takano et al. | ........... | 370/470 |
| 5,386,585 A | * | 1/1995 | Traylor | ........... | 710/127 |
| 5,507,001 A | * | 4/1996 | Nishikawa | ........... | 710/5 |
| 5,790,567 A | * | 8/1998 | Bolotin et al. | ........... | 714/752 |

* cited by examiner

Primary Examiner—Viet D. Vu
(74) Attorney, Agent, or Firm—Birch, Stewart, Kolasch & Birch, LLP

(57) ABSTRACT

In a data transmission apparatus for transmitting data between a main system and a microcomputer a controller generates transmission control signals based on first control signals received from the main system, and a memory system receives the transmission control signals and second control signals from the microcomputer. The memory system transfers data between the main system and the microcomputer based on the transmission control signals and the second control signals.

15 Claims, 4 Drawing Sheets

DATA TRANSMISSION METHOD AND APPARATUS FOR INTERFACING BETWEEN MAIN SYSTEM AND MICROCOMPUTER

BACKGROUND OF THE INVENTION

1. Field of the Invention

The present invention is directed to a data transmission apparatus for transmitting a data between a microcomputer and a main system, and a method thereof, and in particular to a data transmission apparatus capable of applying a low-priced microcomputer to a main system which is not provided with a logic circuit performing an interface with the main system, and of improving a transmission speed by increasing a size of the data that can be processed at a time, and a method thereof.

2. Description of the Background Art

In general, in order to transmit a data between a microcomputer and a main system, the microcomputer includes: a system control register for controlling a chip operation; a host interface control register for controlling a host interface interrupt and fast address (fast A20) gate functions; an input data register and an output data register for carrying out a read/write operation on a processor; a state register for communicating state information during a host interface processing; and a serial/timer control register for controlling a bus interface and a host interface, controlling an operational mode, and selecting a clock source from a timer. In addition, the microcomputer is controlled by external signals, such as a host interface read signal, a host interface write signal, a host interface selection signal for the input data register, the output data register and the state register, and an address gate control signal A20.

Here, only the essential units of the microcomputer for performing a data transmission with the main system will now be described.

FIG. 1 is a block diagram illustrating a structure for transmitting the data between the main system 10 and the microcomputer 20. As shown therein, the microcomputer 20 is provided with a state register 21 storing the state information during the interface processing; the input data register 22 to which the information on a data bus 1 is inputted; and the output data register 23 outputting the stored information to the data bus 1.

The data transmission process between the microcomputer 20 and the main system 10 will now be schematically explained.

First, in order to transmit the information from the main system 10 to the microcomputer 20, when the chip selection signal/CS is low, an input buffer full signal IBF, which is a flag signal, is set at a rising edge of a write control signal/IOW, and the information on the data bus is written on the input data register 22.

On the other hand, in order to transmit the information from the microcomputer 20 to the main system 10, an output buffer full signal OBF, which is a flag signal is cleared at a rising edge of the read control signal/IOR, thereby reading the information stored in the output data register 23 and loading it to the data bus.

Here, an address signal A0 is latched in a fourth bit of the state register 21 in order to determine whether the written information is a command or a data. That is, when the fourth bit of the state register 21 is "0", the information written on the input data register 22 is the data. In the case that the fourth bit thereof is "1", the information is the command.

The above-described process according to the states of the external signals will now be explained in detail.

First, when the address signal/A0, the chip selection signal/CS and the read control signal/IOR are low, and the write control signal/IOW is high, the data is read from the output data register 23. In the case that the address signal/A0 is high, the state is read from the state register 21.

On the other hand, when the chip selection signal/CS, the write control signal/IOW and the address signal/A0 are low, and the read control signal/IOR is high, the data is written on the input data register 22. In the same condition, when the address signal/A0 is high, the command is written thereon.

When the microcomputer 20 is a single-chip microcomputer provided with a register for internally storing a data and a register for storing a command, there is a disadvantage in that chip size and production cost of the microcomputer 20 are increased.

SUMMARY OF THE INVENTION

It is therefore an object of the present invention to provide a data transmission method and apparatus for transmitting a data between a main system and a low-priced microcomputer, which is not provided with a logic circuit capable of performing an interface with the main system, sensing both the main system and the microcomputer by using an error sensing bit in order to sense a problem in transmission, and is capable of improving a transmission speed by increasing a size of the data to be processed at a time.

In order to achieve the above-described object of the present invention, there is provide a data transmission apparatus for transmitting a data between a main system and a microcomputer which is not provided with a logic circuit performing an interface with the main system, including: a signal controller sensing data transmission and generating first and second transmission control signals; a data transmission detector communicating the data transmission to the microcomputer pursuant to the first transmission control signal from the signal controller; and a double buffer latching the data for a predetermined period in order for the main system or microcomputer to read through a corresponding port the data to be transmitted according to the first and second transmission control signals from the signal controller.

In order to achieve the object of the present invention, there is also provided a data transmission method for transmitting a data between a main system and a microcomputer, including: a first transmission step having: a first step for the microcomputer confirming whether a command or data is exactly received and transmitting a request data to the main system to transmit a next-succeeding command or data, when the command or data is partially transmitted from the main system to the microcomputer; and a second step for the microcomputer confirming whether the entire command or data is exactly received and transmitting a first confirmation data to the main system, when the main system receives the request data and transmits the residual command or data to the microcomputer; and a second transmission step having: a third step for the microcomputer receiving a data transmission request data and partially transmitting the data to the main system, when the main system transmits the data transmission request data to the microcomputer; and a fourth step for the microcomputer receiving a second confirmation data and transmitting the residual data to the main system, when the main system confirms whether the transmitted data is exactly received and transmits the second confirmation data to the microcomputer in order to transmit a next-succeeding data.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

Figure 1:
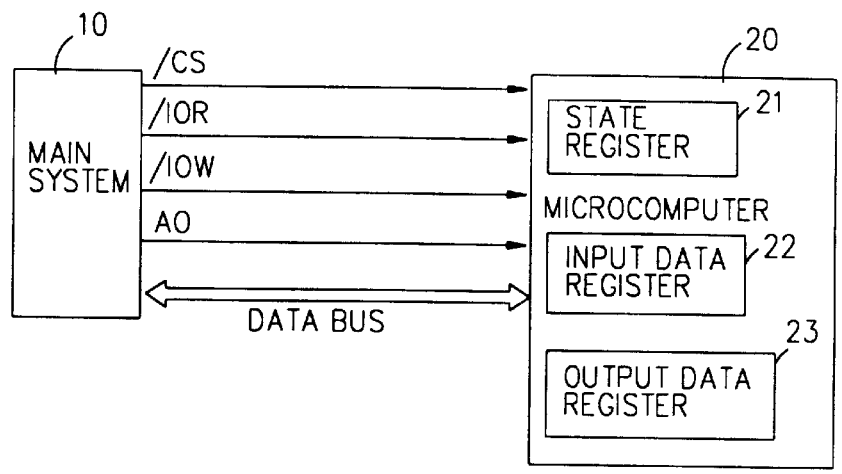
FIG. 1 is a block diagram illustrating a conventional microcomputer.
Figure 2:
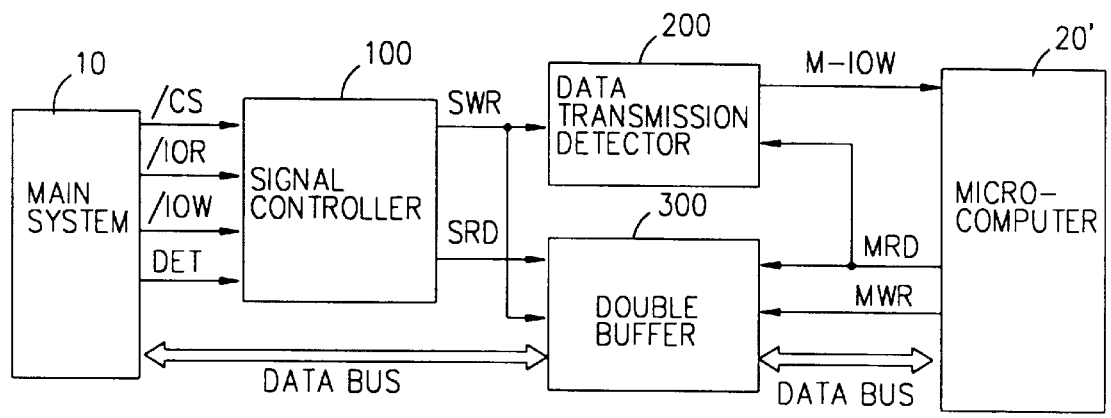
FIG. 2 is a block diagram illustrating a data transmission apparatus according to the present invention.

FIG. 2 is a block diagram illustrating a data transmission apparatus according to the present invention. As shown therein, the data transmission apparatus includes: a signal controller 100 sensing data transmission and generating first and second transmission control signals SWR, SRD, when the data transmission is performed between a main system 10 and a low-priced microcomputer 20' which has a general pin structure, but is not provided with a logic circuit capable of performing an interface with the main system; a data transmission detector 200 communicating the data transmission to the microcomputer pursuant to the first transmission control signal SWR from the signal controller 100; and a double buffer 300 latching the data for a predetermined period in order for the main system 10 or microcomputer 20 to read through a corresponding port the data to be transmitted according to the first and second transmission control signals SWR, SRD from the signal controller 100.

Figure 3:
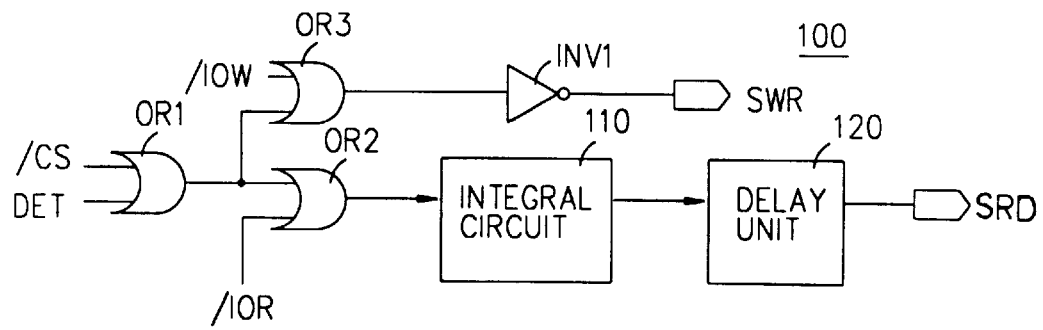
FIG. 3 is a detailed circuit diagram illustrating a signal controller in FIG. 2.

FIG. 3 is a detailed circuit diagram illustrating the signal controller 100. As illustrated therein, the signal controller 100 includes: a first OR gate OR1 combining a chip selection signal/CS and a detection signal DET detecting whether to apply system power; a second OR gate OR2 combining an output signal from the first OR gate OR1 and a read control signal/IOR; an integral circuit 110 stabilizing an output signal from the second OR gate OR2; a delay unit 120 delaying an output signal from the integral circuit 110 and outputting the second transmission signal SWR; a third OR gate OR3 combining the output signal from the first OR gate OR1 and a write control signal/IOW; and a first inverter INV1 inverting an output signal from the third OR gate OR3 and outputting the first transmission control signal SWR.

Figure 4:
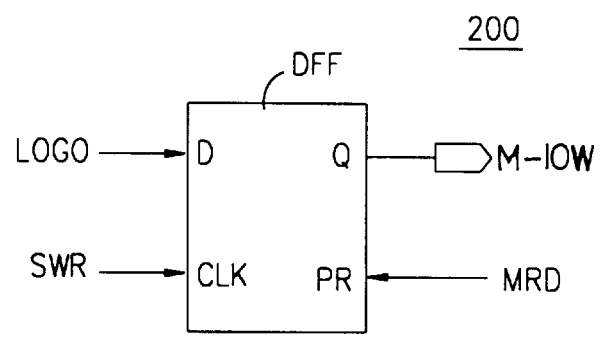
FIG. 4 is a detailed circuit diagram illustrating a data transmission detector in FIG. 2.

FIG. 4 is a detailed circuit diagram illustrating the data transmission detector 200. As shown therein, the data transmission detector 200 includes a flip-flop DFF synchronized by the first transmission control signal SWR from the signal controller 100. The detector 200 receives a signal with a logic value "0" LOGO from the main system 10, and outputs a first recognition signal M-IOW.

Figure 5:
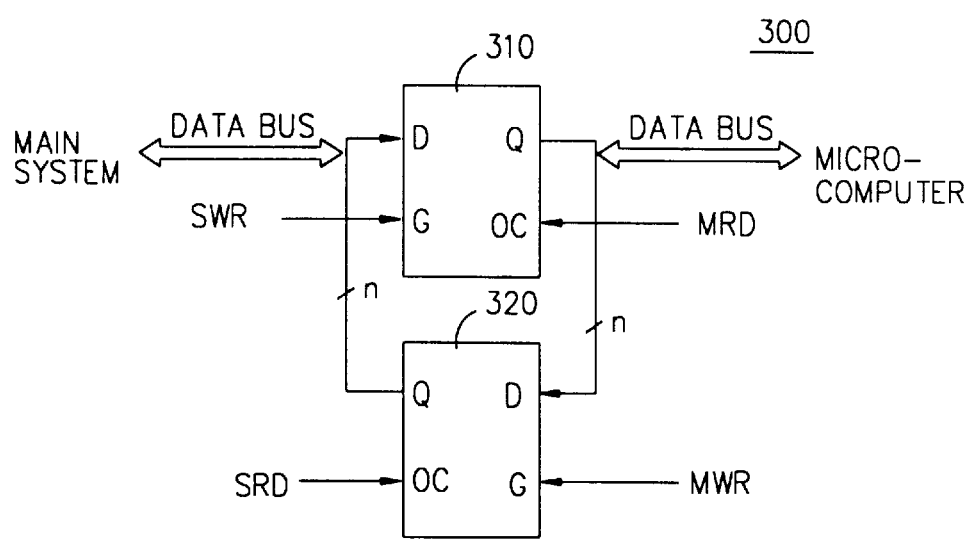
FIG. 5 is a detailed circuit diagram illustrating a double buffer in FIG. 2.

FIG. 5 is a detailed circuit diagram illustrating the double buffer 300. As illustrated therein, the double buffer 300 includes: a first buffer 310 and a second buffer 320. With respect to the first buffer 310, first transmission control signal SWR from the signal controller 100 is applied to its gate enable terminal G and, a first control signal MRD from the microcomputer 20 is being applied to its control terminal OC. With respect to second buffer 320, the second transmission control signal SRD from the signal controller 100 is applied to its control terminal OC and, a second control signal MWR from the microcomputer is applied to its gate enable terminal G.

Here, the chip selection signal/CS is in an active state when an input/output I/O address is decoded and the main system 10 indicates the I/O address. The detection signal DET is a signal for preventing a mis-operation of the microcomputer 20' that is operated even when the main system 10 is not used. The integral circuit 110 of the signal controller 100 is a logic circuit for controlling a timing which may be generated in performing a cycle of the ISA IO(Industry Standard Architecture 10). The integral circuit 110 and delay unit 120 serve to extend a data output time of the double buffer 300 when the main system 10 reads the data from the microcomputer 20'.

The operation of the data transmission apparatus in accordance with the present invention will now be described in detail with reference to the accompanying drawings.

First, when the main system 10 transmits the data to the microcomputer 20', in case the chip selection signal/CS and the write control signal/IOW are low, the data outputted from the main system 10 according to the first transmission control SWR is latched by the first buffer 310 of the double buffer 300 via the data bus, and the data transmission detector 200 is cleared, thereby outputting the first recognition signal M-IOW to the microcomputer 20' in order to communicate that the data is being transmitted from the main system 10.

The microcomputer 20' receives the first recognition signal M-IOW from the data transmission detector 200, outputs the first control signal MRD to the control terminal OC of the first buffer 310 of the double buffer 300, reads the latched data in the first buffer 310, and sets the data transmission detector 200 by outputting the first control signal MRD to a reset terminal PR of the flip-flop DFF thereof.

In order to analyze the data read from the first buffer 310 and transmit a response data to the main system 10, when the microcomputer 20' outputs and latches the response data to the second buffer 320 and outputs the second control signal MWR to the control terminal OC of the second buffer 320, the main system 10 reads the response data latched in the second buffer 320 by using a corresponding port through the data bus.

On the other hand, when the main system 10 receives the data from the microcomputer 20' or transmits the data or command to the microcomputer 20', a size of the data may be preferably adjusted according to a use thereof and a port limit of the microcomputer 20'.

Figure 6A:
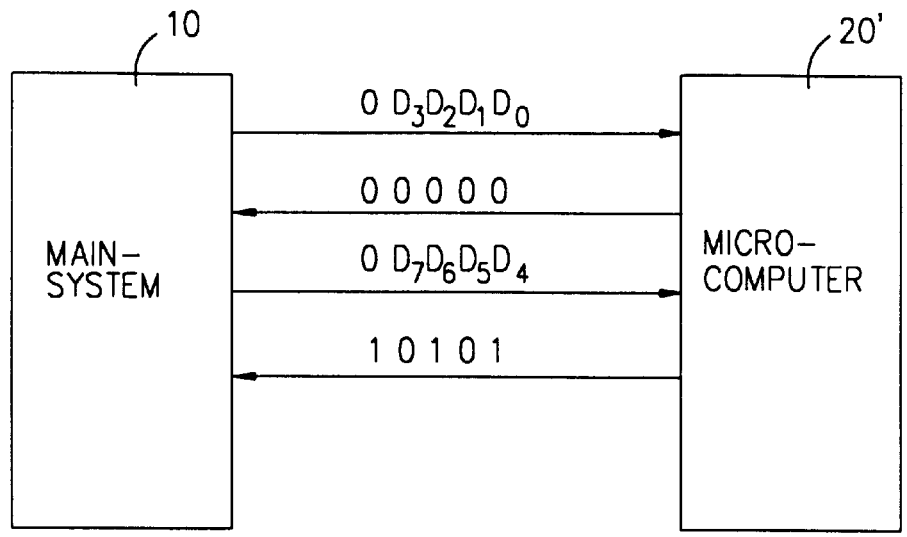
FIGS. 6a to 6c illustrate command or data transmission between the microcomputer and main system according to the present invention.
Figure 6B:
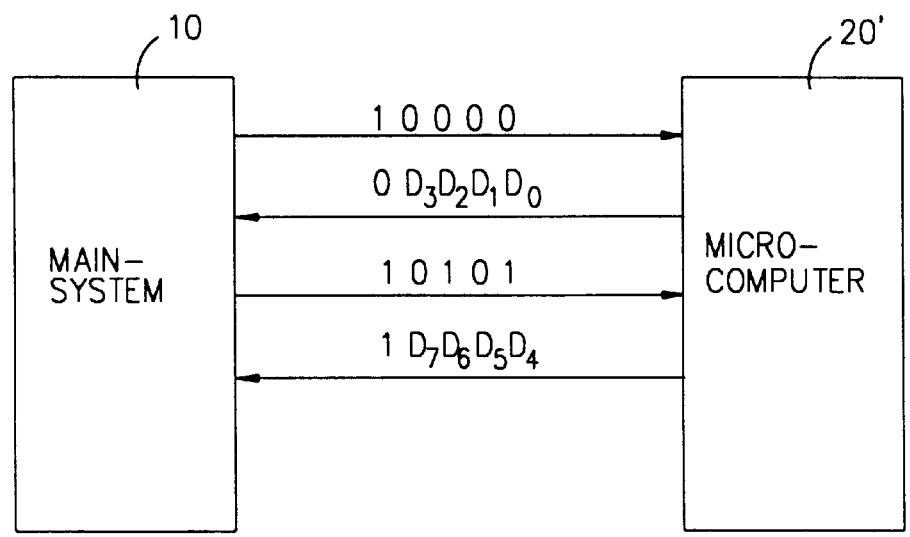
Figure 6C:
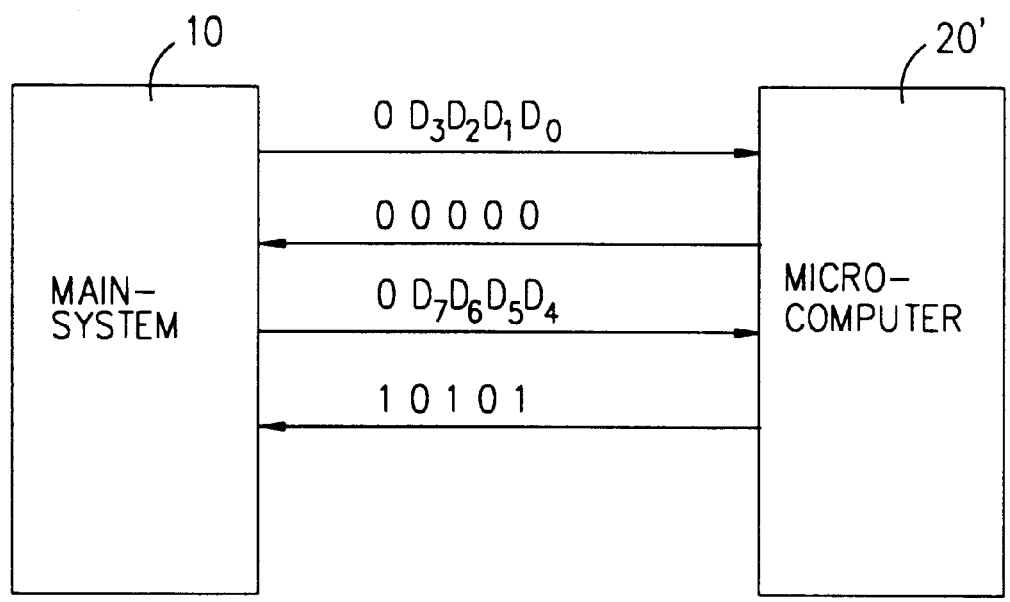

Here, as illustrated in FIGS. 6a to 6c, a size of the data that can be transmitted at a time is set to be 5 bits, and a size of the data or command that can be transmitted is set in one byte unit.

That is, 4 bits are used as the data information, and 1 bit is employed as an error bit for detecting an error during the data transmission between the main system 10 and the microcomputer 20'. In case the transmission data consists of 1 byte, a cycle is completed when the data transmission is performed twice. When the transmission data consists of 2 bytes, the information data is transmitted once when the cycle is carried out four times.

FIG. 6A illustrates the command transmission from the main system 10 to the microcomputer 20'. As shown therein, in the case that the main system 10 transmits one byte command to the microcomputer 20', the main system 10 initially sets the error bit to be "0", and transmits the first four bits D0–D3 of the command to the microcomputer 20'.

When the microcomputer 20' receives the four bit D0–D3 and transmits the response data (00000) to the main system 10, the main system 10 confirms the data transmitted from the microcomputer 20', determines that the firstly-transmitted command D0–D3 is normally received, and transmits the residual command D4–D7 to the microcomputer 20'.

Here, the microcomputer 20' transmits the response data (10101) to the main system 10 in order to communicate that the command is exactly received. The microcomputer 20' combines the two commands data, thereby executing a corresponding command.

As illustrated in FIG. 6B, when receiving the data from the microcomputer 20', the main system 10 transmits the data transmission request data (10000) to the microcomputer 20' and receives the first four bits data D0–D3 therefrom. Then, the main system 10 receives the corresponding data from the microcomputer 20' and transmits the next-succeeding data transmission request data (10101) thereto. The microcomputer 20' transmits the residual four bits data D4–D7 to the main system 10.

Oppositely, as depicted in FIG. 6C, when transmitting the data to the microcomputer 20', the main system 10 sets the error bit to be "0" and transmits the first four bits D0–D3 to the microcomputer 20'. The microcomputer 20' transmits the response data (00000) to the main system 10 in order to communicate that the data is exactly received. The main system 10 confirms the response data and transmits the residual four bits data D4–D7 to the microcomputer 20'.

As described above, according to the data transmission apparatus and the method thereof, an interface with the main system can be embodied by applying to the main system the low-priced microcomputer which is not provided with a logic circuit for performing the interface with the main system. In addition, a simple input device such as a remote controller can be employed for the main system by using the standardized input/output port, regardless of a kind of a keyboard controller. Further, the data transmission apparatus of the present invention can prevent a mis-operation from occurring because it does not intercept an operation between the keyboard and keyboard controller, maintains compatibility with IBM computers, and prevents a speed of the main system from decreasing due to the remote controller.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A data transmission apparatus for transmitting a data between a main system and a microcomputer, comprising:
    a signal controller for sensing data transmission and generating a first transmission control signal for transmitting the data from the main system to a memory system and a second transmission control signal for indicating a state of data transmission from the memory system to the main system;
    a data transmission detector for outputting a recognition signal, indicating whether data is transmitted from the main system to the microcomputer based on the first transmission control signal, the data transmission detector receiving a third transmission control signal from the microcomputer, wherein the third transmission control signal indicates a state of data transmission from the memory system to the microcomputer; and
    the memory system for latching the data for a predetermined period in order for the main system or the microcomputer to read the data to be transmitted through a corresponding port according to the first and second transmission control signals from the signal controller and the third transmission control signal and a fourth transmission control signal from the microcomputer, wherein the fourth transmission control signal is for indicating a state of data transmission from the microcomputer to the memory system.

2. The apparatus of claim 1, wherein the signal controller comprises:
    a first OR gate for combining a chip selection signal and a detection signal detecting whether to apply system power;
    a second OR gate for combining an output signal from the first OR gate and a read control signal;
    an integral circuit and a delay unit for stabilizing an output signal from the second OR gate;
    a third OR gate for combining the output signal from the first OR gate and a write control signal; and
    a first inverter for inverting an output signal from the third OR gate.

3. The apparatus of claim 2, wherein the detection signal prevents a mis-operation of the microcomputer which is operated even when the main system is not used.

4. The apparatus of claim 2, wherein the integral circuit and the delay unit extend a data output time of the memory system when the main system reads the data from the microcomputer.

5. The apparatus of claim 1, wherein the data transmission detector comprises a flip-flop synchronized by an output signal from a first inverter of the signal controller, and for receiving a signal with a logic value "0" from the main system and outputting the recognition signal.

6. The apparatus of claim 2 wherein the memory system comprises:
    a first buffer, the output signal from the first inverter of the signal controller being applied to a gate enable terminal thereof, the third transmission control signal from the microcomputer being applied to a control terminal thereof; and
    a second buffer, an output signal from the delay unit of the signal controller being applied to a control terminal thereof, the fourth transmission control signal from the microcomputer being applied to a gate enable terminal thereof.

7. A data transmission method between a main system and a microcomputer, comprising:
    a first transmission step including:
        a first step for the microcomputer confirming whether a command or data is exactly received and transmitting a request data to the main system to transmit a next-succeeding command or data, when the command or data is partially transmitted from the main system to the microcomputer; and
        a second step for the microcomputer confirming whether the entire command or data is exactly received and transmitting a first confirmation data to the main system, when the main system receives the request data and transmits the residual command or data to the microcomputer; and a second transmission step including:

a third step for the microcomputer receiving a data transmission request data and partially transmitting the data to the main system, when the main system transmits the data transmission request data to the microcomputer; and a fourth step for the microcomputer receiving a second confirmation data and transmitting the residual data to the main system, when the main system confirms whether the transmitted data is exactly received and transmits the second confirmation data to the microcomputer.

8. The method of claim 7, wherein the first data transmission step repeatedly carries out the first step according to a size of the data.

9. The method of claim 7, wherein the second data transmission step repeatedly carries out the third step according to a size of the data.

10. A data transmission method between a main system and a microcomputer, comprising:

a first step for the microcomputer confirming whether a command or data is exactly received and transmitting a request data to the main system to transmit a next-succeeding command or data, when the command or data is partially transmitted from the main system to the microcomputer; and a second step for the microcomputer confirming whether the entire command or data is exactly received and transmitting a first confirmation data to the main system, when the main system receives the request data and transmits the residual command or data to the microcomputer.

11. A data transmission method between a main system and a microcomputer, comprising:

a first step for the microcomputer receiving a data transmission requesting data and partially transmitting data to the main system, when the main system transmits the data transmission requesting data to the microcomputer; and a second step for the microcomputer receiving a second confirmation data and transmitting residual data associated with the partially transmitted data to the main system, when the main system confirms whether the partially transmitted data is exactly received and transmits the second confirmation data to the microcomputer.

12. A data transmission apparatus for transmitting a data between a main system and a microcomputer, comprising:

a signal controller for sensing data transmission and generating first and second transmission control signals;

a data transmission detector for outputting a first cognition signal, indicating whether data is to be transmitted from the main system to the microcomputer, to the microcomputer based on the first transmission control signal and receiving a third transmission control signal from the microcomputer indicating a state of the data transmission from the main system to the microcomputer; and a memory system for latching the data for a predetermined period in order for the main system or microcomputer to read the data to be transmitted through a corresponding port according to the first and second transmission control signals from the signal controller and the third and fourth transmission control signals from the microcomputer, wherein the signal controller comprises:

a first logic gate for combining a chip selection signal and a detection signal detecting whether to apply system power;

a second logic gate for combining an output signal from the first logic gate and a read control signal;

an integral circuit and a delay unit for stabilizing an output signal from the second logic gate;

a third logic gate for combining the output signal from the first logic gate and a write control signal; and a first inverter for inverting an output signal from the third logic gate.

13. The apparatus of claim 12, wherein the detection signal prevents a mis-operation of the computer which is operated even when the main system is not used.

14. The apparatus of claim 12, wherein the integral circuit and the delay unit extend a data output time of the memory system when the main system reads the data from the microcomputer.

15. The apparatus of claim 12, wherein the memory system comprises:

a first buffer, the output signal from the first inverter of the signal controller being applied to a gate enable terminal thereof, the third transmission control signal from the microcomputer being applied to a control terminal thereof; and a second buffer, an output signal from the delay unit of the signal controller being applied to a control terminal thereof, the fourth transmission control signal from the microcomputer being applied to a gate enable terminal thereof.

* * * * *